United States Patent
Kucera et al.

(10) Patent No.: US 10,697,815 B2
(45) Date of Patent: Jun. 30, 2020

(54) SYSTEM AND METHODS FOR MITIGATING CONDENSATION IN A SENSOR MODULE

(71) Applicant: Honeywell International Inc., Morris Plains, NJ (US)

(72) Inventors: David Kucera, Bilovice nad Svitavou (CZ); Jos Praat, Borger (NL); Hans van der Mei, Oosterhesselen (NL); Willem Super, Emmen (NL); Milos Trenz, Ivancice (CZ); Martin Bragg, Bracknell (GB)

(73) Assignee: Honeywell International Inc., Morris Plains, NJ (US)

( * ) Notice: Subject to any disclaimer, the term of this patent is extended or adjusted under 35 U.S.C. 154(b) by 231 days.

(21) Appl. No.: 16/004,383

(22) Filed: Jun. 9, 2018

(65) Prior Publication Data

US 2019/0376828 A1 Dec. 12, 2019

(51) Int. Cl.
*G01F 15/08* (2006.01)
(52) U.S. Cl.
CPC .................................. *G01F 15/08* (2013.01)
(58) Field of Classification Search
None
See application file for complete search history.

(56) References Cited

U.S. PATENT DOCUMENTS

| | | | |
|---|---|---|---|
| 156,769 A | 11/1874 | Cameron | |
| 424,581 A | 4/1890 | Sickels | |
| 1,033,204 A | 7/1912 | Skinner | |
| 1,147,840 A | 7/1915 | Bowser | |
| 1,156,977 A | 10/1915 | Cloos | |
| 1,165,315 A | 12/1915 | Cameron | |
| 1,206,532 A | 11/1916 | Gray | |
| 1,847,385 A | 3/1932 | Dengler | |
| 2,093,122 A | 9/1937 | Andrews | |
| 2,196,798 A | 4/1940 | Horstmann | |
| 2,403,692 A | 7/1946 | Tibbetts | |
| 2,440,329 A | 4/1948 | Doble | |
| 2,497,549 A | 2/1950 | Heller | |
| 2,561,793 A | 7/1951 | Furczyk | |

(Continued)

FOREIGN PATENT DOCUMENTS

| | | |
|---|---|---|
| DE | 3638604 A1 | 5/1988 |
| DE | 19617852 A1 | 10/1997 |

(Continued)

OTHER PUBLICATIONS

"Flexible, Compact and with a High Performance—the New Valvario, G. Kromschroder AG Launches it's New, Improved Series of Gas Fittings," Press Release, 2 pages, 2003.

(Continued)

*Primary Examiner* — Francis C Gray

(57) ABSTRACT

Methods and systems for mitigating condensation in a sensor module of a combustion appliance are disclosed. In one example, a fluid flow from a main conduit is cooled with a passive heat exchanger. A sensor of a sensor module may be heated to a temperature above the cooled fluid flow. Cooling the incoming fluid flow with a passive heat exchanger and/or heating the downstream flow sensor may help mitigate condensation in the sensor module, and in particular, on the sensor device. This may help increase the reliability of the system.

20 Claims, 7 Drawing Sheets

(56) References Cited

U.S. PATENT DOCUMENTS

| | | |
|---|---|---|
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker et al. |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,388,003 A * | 6/1983 | Feller ............. G01K 17/16 374/41 |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,498,863 A | 2/1985 | Hanson et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,622,999 A | 11/1986 | Ray |
| 4,645,450 A | 2/1987 | West |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,798,531 A | 1/1989 | Breckner |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,935,118 A | 6/1990 | Agarwal et al. |
| 4,938,742 A | 7/1990 | Smits |
| 4,939,405 A | 7/1990 | Okuyama et al. |
| 5,022,435 A | 6/1991 | Jaw-Shiunn |
| 5,024,265 A | 6/1991 | Buchholz et al. |
| 5,026,171 A * | 6/1991 | Feller ............. F28F 27/00 374/40 |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beattty |
| 5,146,941 A | 9/1992 | Statler |
| 5,148,074 A | 9/1992 | Fujita et al. |
| 5,169,063 A | 12/1992 | Miyazaki et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Dhnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | van Lintel |
| 5,224,843 A | 7/1993 | Van Lintel |
| 5,244,527 A | 9/1993 | Aoyagi |
| 5,244,537 A | 9/1993 | Dhnstein |
| 5,263,514 A | 11/1993 | Reeves |
| 5,294,089 A | 3/1994 | LaMarca |
| 5,317,670 A | 5/1994 | Elia |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,662,465 A | 9/1997 | Kano |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitikiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |

(56) References Cited

U.S. PATENT DOCUMENTS

| | | |
|---|---|---|
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,971,746 A | 10/1999 | Givens et al. |
| 5,986,573 A | 11/1999 | Franklin et al. |
| 5,997,280 A | 12/1999 | Welz, Jr. et al. |
| 6,003,552 A | 12/1999 | Shank et al. |
| 6,050,281 A | 4/2000 | Adams et al. |
| 6,057,771 A | 5/2000 | Lakra |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | La Marca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,903,526 B2 | 6/2005 | Weisser et al. |
| 6,906,484 B1 | 6/2005 | Berroth et al. |
| 6,923,069 B1 | 8/2005 | Stewart |
| 6,949,903 B2 | 9/2005 | Berroth et al. |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,036,791 B2 | 5/2006 | Wiese |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,260,994 B2 | 8/2007 | Oboodi et al. |
| 7,290,502 B2 | 11/2007 | Kidd et al. |
| 7,290,902 B2 | 11/2007 | Suehiro et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,398,796 B2 | 7/2008 | Hjorth et al. |
| 7,402,925 B2 | 7/2008 | Best et al. |
| 7,405,609 B2 | 7/2008 | Krotsch |
| 7,422,028 B2 | 9/2008 | Nugent et al. |

(56) References Cited

U.S. PATENT DOCUMENTS

| | | |
|---|---|---|
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,554,279 B2 | 6/2009 | Loffler et al. |
| 7,556,238 B2 | 7/2009 | Seberger |
| 7,565,225 B2 | 7/2009 | Dushane et al. |
| 7,574,896 B1 | 8/2009 | Cooper |
| 7,586,228 B2 | 9/2009 | Best |
| 7,586,276 B2 | 9/2009 | Dornhof |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,842 B1 | 1/2010 | Killian et al. |
| 7,669,461 B2 | 3/2010 | Kates et al. |
| 7,688,011 B2 | 3/2010 | Berroth et al. |
| 7,715,168 B2 | 5/2010 | Gofman et al. |
| 7,740,024 B2 | 6/2010 | Brodeur et al. |
| 7,759,884 B2 | 7/2010 | Dufner et al. |
| 7,769,493 B2 | 8/2010 | Elshafei et al. |
| 7,805,928 B2 | 10/2010 | Shouda et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,820,949 B2 | 10/2010 | Sasaki et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,904,608 B2 | 3/2011 | Price |
| 7,905,251 B2 | 3/2011 | Flanders |
| 7,922,481 B2 | 4/2011 | Geiger et al. |
| 7,940,189 B2 | 5/2011 | Brown |
| 7,957,132 B2 * | 6/2011 | Fried .................. F28D 15/0266 361/679.47 |
| 8,020,585 B2 | 9/2011 | Shock et al. |
| 8,024,978 B2 | 9/2011 | Khemet et al. |
| 8,036,837 B2 | 10/2011 | Wilke |
| 8,061,212 B2 | 11/2011 | Shubert |
| 8,066,255 B2 | 11/2011 | Wang |
| 8,099,248 B2 | 1/2012 | Umekage et al. |
| 8,104,510 B2 | 1/2012 | Ams et al. |
| 8,109,289 B2 | 2/2012 | Trnka et al. |
| 8,126,631 B2 | 2/2012 | Scalia, Jr. |
| 8,205,484 B2 | 6/2012 | Sasaki |
| 8,212,507 B2 | 7/2012 | Wystup et al. |
| 8,215,160 B2 | 7/2012 | Saito et al. |
| 8,225,814 B2 | 7/2012 | Igarashi |
| 8,235,064 B2 | 8/2012 | Kasprzyk et al. |
| 8,240,636 B2 | 8/2012 | Smith |
| 8,258,660 B2 | 9/2012 | Strobel et al. |
| 8,265,794 B2 | 9/2012 | Minervini et al. |
| 8,271,141 B2 | 9/2012 | Cummings et al. |
| 8,286,937 B2 | 10/2012 | Forster |
| 8,297,948 B2 | 10/2012 | Laufer et al. |
| 8,307,845 B2 | 11/2012 | Kouchi et al. |
| 8,319,461 B2 | 11/2012 | Wystup et al. |
| 8,353,281 B2 | 1/2013 | Oberhomburg et al. |
| 8,380,448 B2 | 2/2013 | Franklin |
| 8,381,760 B2 | 2/2013 | Santinanavat et al. |
| 8,387,441 B2 | 3/2013 | Falta et al. |
| 8,439,667 B2 | 5/2013 | Fan et al. |
| 8,473,229 B2 | 6/2013 | Kucera et al. |
| 8,500,441 B2 | 8/2013 | Geiger et al. |
| 8,539,972 B2 | 9/2013 | Xu |
| 8,550,109 B2 | 10/2013 | Miyata et al. |
| 8,567,757 B2 | 10/2013 | Pitchford et al. |
| 8,596,957 B2 | 12/2013 | Seebauer |
| 8,636,501 B2 | 1/2014 | Geiger et al. |
| 8,639,464 B2 | 1/2014 | Artiuch et al. |
| 8,677,913 B2 | 3/2014 | Kastingschafer et al. |
| 8,721,325 B2 | 5/2014 | Geiger et al. |
| 8,746,275 B2 | 6/2014 | Santinanavat et al. |
| 8,807,092 B2 | 8/2014 | Smelcer |
| 8,839,815 B2 | 9/2014 | Young et al. |
| 8,899,264 B2 | 12/2014 | Young et al. |
| 8,905,063 B2 | 12/2014 | Young et al. |
| 8,947,242 B2 | 2/2015 | Kucera et al. |
| 9,017,612 B2 | 4/2015 | Tsukabayashi et al. |
| 9,020,765 B2 | 4/2015 | Seebauer |
| 9,074,770 B2 | 7/2015 | Young et al. |
| 9,097,194 B2 | 8/2015 | Suzuki et al. |
| 9,109,610 B2 | 8/2015 | Streng et al. |
| 9,222,816 B2 | 12/2015 | Patel et al. |
| 9,234,661 B2 | 1/2016 | Young et al. |
| 9,557,059 B2 | 1/2017 | Kucera et al. |
| 9,657,946 B2 | 5/2017 | Young et al. |
| 10,012,412 B2 | 7/2018 | Van Wyk et al. |
| 2002/0029808 A1 | 3/2002 | Friend et al. |
| 2002/0175791 A1 | 11/2002 | LaMarca et al. |
| 2003/0054302 A1 | 3/2003 | Miliani et al. |
| 2003/0167851 A1 | 9/2003 | Parker |
| 2004/0035211 A1 | 2/2004 | Pinto et al. |
| 2004/0217182 A1 | 11/2004 | St. Jean et al. |
| 2005/0199286 A1 | 9/2005 | Appleford et al. |
| 2005/0279956 A1 | 12/2005 | Berger et al. |
| 2006/0226299 A1 | 10/2006 | Tungl et al. |
| 2006/0243334 A1 | 11/2006 | Brochhaus et al. |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0024255 A1 | 2/2007 | Yasumura |
| 2007/0068511 A1 | 3/2007 | Bachinsky et al. |
| 2007/0082304 A1 | 4/2007 | Burnham et al. |
| 2007/0089789 A1 | 4/2007 | Mudd et al. |
| 2007/0164243 A1 | 7/2007 | Volz |
| 2007/0256478 A1 | 11/2007 | Guadagnola et al. |
| 2008/0099082 A1 | 5/2008 | Moenkhaus |
| 2008/0157707 A1 | 7/2008 | Jeske et al. |
| 2008/0318098 A1 | 12/2008 | Matsunaga |
| 2009/0068503 A1 | 3/2009 | Yamazaki et al. |
| 2009/0105852 A1 | 4/2009 | Wintrich et al. |
| 2009/0120338 A1 | 5/2009 | Adendorf et al. |
| 2009/0126798 A1 | 5/2009 | Mather |
| 2009/0142717 A1 | 6/2009 | Lavelle |
| 2009/0197212 A1 | 8/2009 | Masen |
| 2009/0205416 A1 * | 8/2009 | Campbell .................. G01F 1/34 73/202.5 |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0112500 A1 | 5/2010 | Maiello et al. |
| 2010/0138167 A1 | 6/2010 | Bessyo et al. |
| 2010/0146939 A1 | 6/2010 | Sim et al. |
| 2011/0039217 A1 | 2/2011 | Happe |
| 2011/0041483 A1 | 2/2011 | Kapparos |
| 2011/0240157 A1 | 10/2011 | Jones et al. |
| 2011/0277967 A1 * | 11/2011 | Fried .................. F28D 15/0266 165/104.26 |
| 2012/0107753 A1 | 5/2012 | Kemp |
| 2013/0108971 A1 | 5/2013 | Maiello et al. |
| 2013/0153041 A1 | 6/2013 | Kucera et al. |
| 2013/0153042 A1 | 6/2013 | Young et al. |
| 2013/0153798 A1 | 6/2013 | Kucera et al. |
| 2013/0205822 A1 * | 8/2013 | Heiland .................. H05K 7/2079 62/259.2 |
| 2014/0096850 A1 | 4/2014 | Filkovski et al. |
| 2015/0045971 A1 | 2/2015 | Endel et al. |
| 2015/0107675 A1 | 4/2015 | Kucera |
| 2016/0123584 A1 | 5/2016 | Young et al. |
| 2016/0245240 A1 | 8/2016 | Pursifull et al. |

(56) References Cited

U.S. PATENT DOCUMENTS

| | | |
|---|---|---|
| 2016/0319779 A1 | 11/2016 | LaPointe et al. |
| 2016/0326967 A1 | 11/2016 | Yamamoto et al. |
| 2017/0134214 A1 | 5/2017 | Sethuraman et al. |

FOREIGN PATENT DOCUMENTS

| | | |
|---|---|---|
| DE | 19824521 A1 | 12/1999 |
| DE | 102005033611 B3 | 10/2006 |
| DE | 102008052394 A1 | 4/2010 |
| EP | 0062854 A1 | 10/1982 |
| EP | 0068517 A1 | 1/1983 |
| EP | 0275439 A1 | 7/1988 |
| EP | 0282758 A2 | 9/1988 |
| EP | 0356690 A1 | 3/1990 |
| EP | 0522479 A2 | 1/1993 |
| EP | 0563787 A1 | 10/1993 |
| EP | 0617234 A1 | 9/1994 |
| EP | 0645562 A1 | 3/1995 |
| EP | 0652501 A2 | 5/1995 |
| EP | 0664422 A1 | 7/1995 |
| EP | 0665396 A1 | 8/1995 |
| EP | 0678178 A1 | 10/1995 |
| EP | 0744821 A2 | 11/1996 |
| EP | 0757200 A2 | 2/1997 |
| EP | 0822376 A2 | 2/1998 |
| EP | 0817931 B1 | 12/1998 |
| EP | 0881435 B1 | 12/1998 |
| EP | 0896191 A2 | 2/1999 |
| EP | 0896192 A1 | 2/1999 |
| EP | 0907052 A2 | 4/1999 |
| EP | 0817934 B1 | 5/1999 |
| EP | 0952357 A1 | 10/1999 |
| EP | 0976957 A2 | 2/2000 |
| EP | 1031792 A2 | 8/2000 |
| EP | 1069357 A2 | 1/2001 |
| EP | 1073192 A2 | 1/2001 |
| EP | 1084357 A2 | 3/2001 |
| EP | 1084358 A1 | 3/2001 |
| EP | 1121511 A1 | 8/2001 |
| EP | 1176317 A1 | 1/2002 |
| EP | 1186779 A1 | 3/2002 |
| EP | 1157205 B1 | 9/2002 |
| EP | 0992658 B1 | 5/2003 |
| EP | 1323966 A1 | 7/2003 |
| EP | 1078187 B1 | 8/2003 |
| EP | 1382907 A1 | 1/2004 |
| EP | 1403885 A2 | 3/2004 |
| EP | 1269054 B1 | 8/2004 |
| EP | 1484509 A1 | 12/2004 |
| EP | 1191676 B1 | 1/2005 |
| EP | 1275039 B1 | 1/2005 |
| EP | 1446607 B1 | 3/2005 |
| EP | 1510756 A1 | 3/2005 |
| EP | 1299665 B1 | 4/2005 |
| EP | 1324496 B1 | 6/2005 |
| EP | 1584870 A2 | 10/2005 |
| EP | 1243857 B1 | 12/2005 |
| EP | 1282798 B1 | 12/2005 |
| EP | 1424708 B1 | 12/2005 |
| EP | 0843287 B1 | 2/2006 |
| EP | 1346463 B1 | 3/2006 |
| EP | 1535388 B1 | 6/2006 |
| EP | 1703140 A1 | 9/2006 |
| EP | 1703146 A2 | 9/2006 |
| EP | 1183772 B1 | 10/2006 |
| EP | 1303718 B1 | 10/2006 |
| EP | 1314240 B1 | 10/2006 |
| EP | 1715229 A2 | 10/2006 |
| EP | 1256763 B1 | 11/2006 |
| EP | 1727268 A2 | 11/2006 |
| EP | 1559936 B1 | 12/2006 |
| EP | 1748534 A2 | 1/2007 |
| EP | 1748545 A2 | 1/2007 |
| EP | 1327808 B1 | 2/2007 |
| EP | 1329659 B1 | 2/2007 |
| EP | 1291532 B1 | 6/2007 |
| EP | 1610046 B1 | 6/2007 |
| EP | 1592905 B1 | 7/2007 |
| EP | 1610045 B1 | 7/2007 |
| EP | 1727261 B1 | 10/2007 |
| EP | 1860328 A1 | 11/2007 |
| EP | 1626321 B1 | 2/2008 |
| EP | 1848907 B1 | 4/2008 |
| EP | 1936778 A2 | 6/2008 |
| EP | 1413045 B1 | 7/2008 |
| EP | 1499008 B1 | 10/2008 |
| EP | 1882882 A2 | 10/2008 |
| EP | 1536169 B1 | 11/2008 |
| EP | 1298679 B1 | 12/2008 |
| EP | 1714040 B1 | 12/2008 |
| EP | 2014979 A2 | 1/2009 |
| EP | 1669648 B1 | 2/2009 |
| EP | 2048439 A1 | 4/2009 |
| EP | 1659462 B1 | 6/2009 |
| EP | 2093545 B1 | 8/2009 |
| EP | 2107248 A2 | 10/2009 |
| EP | 2116857 A1 | 11/2009 |
| EP | 2119946 A1 | 11/2009 |
| EP | 1370787 B1 | 3/2010 |
| EP | 1413044 B1 | 3/2010 |
| EP | 2164164 A1 | 3/2010 |
| EP | 2177796 A2 | 4/2010 |
| EP | 2178201 A1 | 4/2010 |
| EP | 1970610 B1 | 5/2010 |
| EP | 2197101 | 6/2010 |
| EP | 2068056 B1 | 8/2010 |
| EP | 1712800 B1 | 10/2010 |
| EP | 2118493 B1 | 10/2010 |
| EP | 2242344 A1 | 10/2010 |
| EP | 1715582 B1 | 11/2010 |
| EP | 1675757 B1 | 12/2010 |
| EP | 2267883 A1 | 12/2010 |
| EP | 1703139 B1 | 1/2011 |
| EP | 2286976 A1 | 2/2011 |
| EP | 1596495 B1 | 4/2011 |
| EP | 2212984 B1 | 4/2011 |
| EP | 2306622 A1 | 4/2011 |
| EP | 2010500 B1 | 6/2011 |
| EP | 2113696 B1 | 7/2011 |
| GB | 2099158 A | 12/1982 |
| GB | 2327750 A | 2/1999 |
| JP | 02086258 A | 3/1990 |
| JP | 05219760 A | 8/1993 |
| JP | 9061284 A | 3/1997 |
| JP | 9184600 A | 7/1997 |
| JP | 2004125809 A | 4/2004 |
| JP | 2004309159 A | 11/2004 |
| JP | 2008135922 A | 6/2008 |
| JP | 2008286478 A | 11/2008 |
| JP | 2008309350 A | 12/2008 |
| KR | 1188821 B1 | 10/2012 |
| SU | 744877 B | 6/1980 |
| WO | 8705375 A1 | 9/1987 |
| WO | 9627095 A1 | 9/1996 |
| WO | 9729538 A1 | 8/1997 |
| WO | 9801709 A2 | 1/1998 |
| WO | 9924758 A1 | 5/1999 |
| WO | 9960292 A1 | 11/1999 |
| WO | 9964769 A2 | 12/1999 |
| WO | 9964770 A1 | 12/1999 |
| WO | 0028215 A1 | 5/2000 |
| WO | 0106179 A1 | 1/2001 |
| WO | 0133078 A1 | 5/2001 |
| WO | 0161226 A1 | 8/2001 |
| WO | 0173297 A2 | 10/2001 |
| WO | 0190617 A1 | 11/2001 |
| WO | 0204852 A1 | 1/2002 |
| WO | 02077502 A1 | 10/2002 |
| WO | 02084156 A1 | 10/2002 |
| WO | 02086365 A1 | 10/2002 |
| WO | 02086918 A1 | 10/2002 |
| WO | 02097840 A1 | 12/2002 |
| WO | 2004059830 A2 | 7/2004 |
| WO | 2004070245 A1 | 8/2004 |

(56) References Cited

FOREIGN PATENT DOCUMENTS

| | | | |
|---|---|---|---|
| WO | 2005042313 A1 | 5/2005 |
| WO | 2005076455 A1 | 8/2005 |
| WO | 2005076456 A1 | 8/2005 |
| WO | 2005085652 A1 | 9/2005 |
| WO | 2005094150 A1 | 10/2005 |
| WO | 2006000366 A1 | 1/2006 |
| WO | 2006000367 A1 | 1/2006 |
| WO | 2006039956 A1 | 4/2006 |
| WO | 2006042635 A1 | 4/2006 |
| WO | 2006053816 A1 | 5/2006 |
| WO | 2006077069 A1 | 7/2006 |
| WO | 2006088367 A2 | 8/2006 |
| WO | 2007012419 A2 | 2/2007 |
| WO | 2007018876 A1 | 2/2007 |
| WO | 2007093312 A1 | 8/2007 |
| WO | 2007140927 A1 | 12/2007 |
| WO | 2008061575 A1 | 3/2008 |
| WO | 2008039061 A1 | 4/2008 |
| WO | 2008119404 A1 | 10/2008 |
| WO | 2008141911 A1 | 11/2008 |
| WO | 2008148401 A1 | 12/2008 |
| WO | 2009000481 A1 | 12/2008 |
| WO | 2009049694 A1 | 4/2009 |
| WO | 2009065815 A2 | 5/2009 |
| WO | 2009073510 A2 | 6/2009 |
| WO | 2009089857 A1 | 7/2009 |
| WO | 2009126020 A1 | 10/2009 |
| WO | 2010018192 A2 | 2/2010 |
| WO | 2010052137 A2 | 5/2010 |
| WO | 2010056111 A1 | 5/2010 |
| WO | 2010083877 A1 | 7/2010 |
| WO | 2011010274 A1 | 1/2011 |
| WO | 2011045776 A1 | 4/2011 |
| WO | 2011047895 A1 | 4/2011 |
| WO | 2011051002 A1 | 5/2011 |
| WO | 2011069805 A1 | 6/2011 |
| WO | 2011072888 A1 | 6/2011 |
| WO | 2011092011 A2 | 8/2011 |
| WO | 2011095928 A1 | 8/2011 |
| WO | 2013101545 A1 | 7/2013 |

OTHER PUBLICATIONS

"Large-Scale Linearization Circuit for Electrostatic Motors" IBM Technical Disclosure Bulletin, IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching," pp. 331-339, prior to Dec. 29, 2004.
Bonne et al. "Actuation-Based Fuel Gas Microsensors," IGT Symposium on Natural Gas Quality, Energy Measurement, Metering and Utilization Practices, 17 pages, Mar. 2001.
Branebjerg, "A New Electrostatic Actuator Providing Improved Stroke Length and Force," IEEE, pp. 6-11, Feb. 4-7, 1992.
Bustgens et al., "Micropump Manufactured by Thermoplastic Molding," IEEE, pp. 18-21, 1994.

Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2011.
European Search Report for EP Application No. 12196398.7 dated Jun. 11, 2011.
Examination Report for EP Application No. 12196398.7, dated Apr. 11, 2014.
CSA, "B149.351-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65-DN100," 8 pages, prior to Dec. 15, 2011.
Dungs Combustion Controls, "Double Solenoid Valve Control and Safety Combination Valve Servo Pressure controller, DMV-SE 507/11-525/11," 8 pages, prior to Dec. 15, 2011.
Dungs Combustion Controls, "Double Solenoid Valve Regulator and Safety Combination Infinitely Variable Floating Dperation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A412" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.

(56) References Cited

OTHER PUBLICATIONS

Freund et al., "A Chemically Diverse Conducting Polymer-Based 'Electronic Nose'," Proceedings of the National Academy of Sciences of the United States of America, vol. 92, No. 7, pp. 2652-2656, Mar. 28, 1995.
Haig, "On a Nonvolatile Memory Cell Based on Micro-Electro-Mechanics," IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve Vag," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE, pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Universal Metering, "SmartValve Wireless Shut-Off Valve," Universal Metering Ltd., 4 pages, prior to Mar. 12, 2013.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.
"Honeywell Zephyr Digital Airflow Sensors HAF Series-High Accuracy," Honeywell, 14 pages, Jun. 2015.
International Search Report and Written Opinion for Application No. PCT/US2019/036093, 8 pages, dated Sep. 19, 2019.

* cited by examiner

SYSTEM AND METHODS FOR MITIGATING CONDENSATION IN A SENSOR MODULE

TECHNICAL FIELD

The present disclosure relates generally to sensor modules, and more particularly, systems and method for mitigating condensation in such sensor modules.

BACKGROUND

Sensing modules are used in wide variety of application including, for example, residential, commercial, automotive, aerospace, industrial, and medical applications. In many applications, sensor modules may include one or more sensor devices that detect, for example, flow, pressure, temperature, and/or any other parameters of interest. In some cases, the exposure of the sensor devices to condensation or the like can cause damage to the sensor devices resulting in premature failure of the sensor module. As such, what would be desirable is a system and method for mitigating condensation in such sensor modules.

SUMMARY

The present disclosure relates generally to sensor modules, and more particularly, systems and method for mitigating condensation in such sensor modules.

In one example, a flow sensing system for sensing a fluid flow through a conduit is disclosed. The conduit has an upstream pickup port and a downstream pickup port. The illustrative flow sensing system includes a heat exchanger having an inlet port, an outlet port, and a passive heat sink, and a sensing module having an inlet port, an outlet port, and a flow sensor. The inlet port of the heat exchanger may be configured to receive a flow of fluid from the upstream pickup port of the conduit. The heat exchanger may be configured to pass the flow of fluid from the inlet port across the passive heat sink and deliver the flow of fluid to the outlet port of the heat exchanger. In some cases, the heat exchanger may include a drain for draining condensate. The inlet port of the sensing module may be configured to receive the flow of fluid from the outlet port of the heat exchanger. The sensing module may be configured to pass at least part of the flow of fluid across the flow sensor and deliver the flow of fluid to the outlet port of the sensing module. The outlet port of the sensing module may be configured to be in fluid communication with the downstream pickup port of the conduit.

In another example, a flow sensing module may include a housing, a sensor, and a heater. The housing may include an inlet port, an outlet port, and one or more flow channels extending from the inlet port to the outlet port, where each of the one or more flow channels may be defined by internal walls that are exposed to a flow of fluid flowing from the inlet port to the outlet port of the housing. The sensor may be at least partially positioned within the housing and exposed to one or more of the flow channels. The sensor may be configured to sense a measure related to a flow rate of the fluid flowing from the inlet port to the outlet port of the housing. The heater may be configured to heat the sensor to a temperature that is above a temperature of the flow of fluid received at the inlet port of the housing. This may help mitigate the collection of condensate on the sensor.

In another example, a method of sensing a measure related to a gas flow rate provided to a combustion appliance may be provided. The illustrative method may include receiving a gas flow and cooling the gas flow via a passive heat sink and draining any condensate. The method may further include heating a flow sensor to a temperature above the temperature to which the gas flow was cooled and providing the cooled gas flow to the flow sensor. Then, a measure related to a flow rate of the cooled gas flow may be sensed using the heated flow sensor. A combustion appliance may be controlled based, at least in part, on the measure related to the flow rate of the cooled gas flow.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
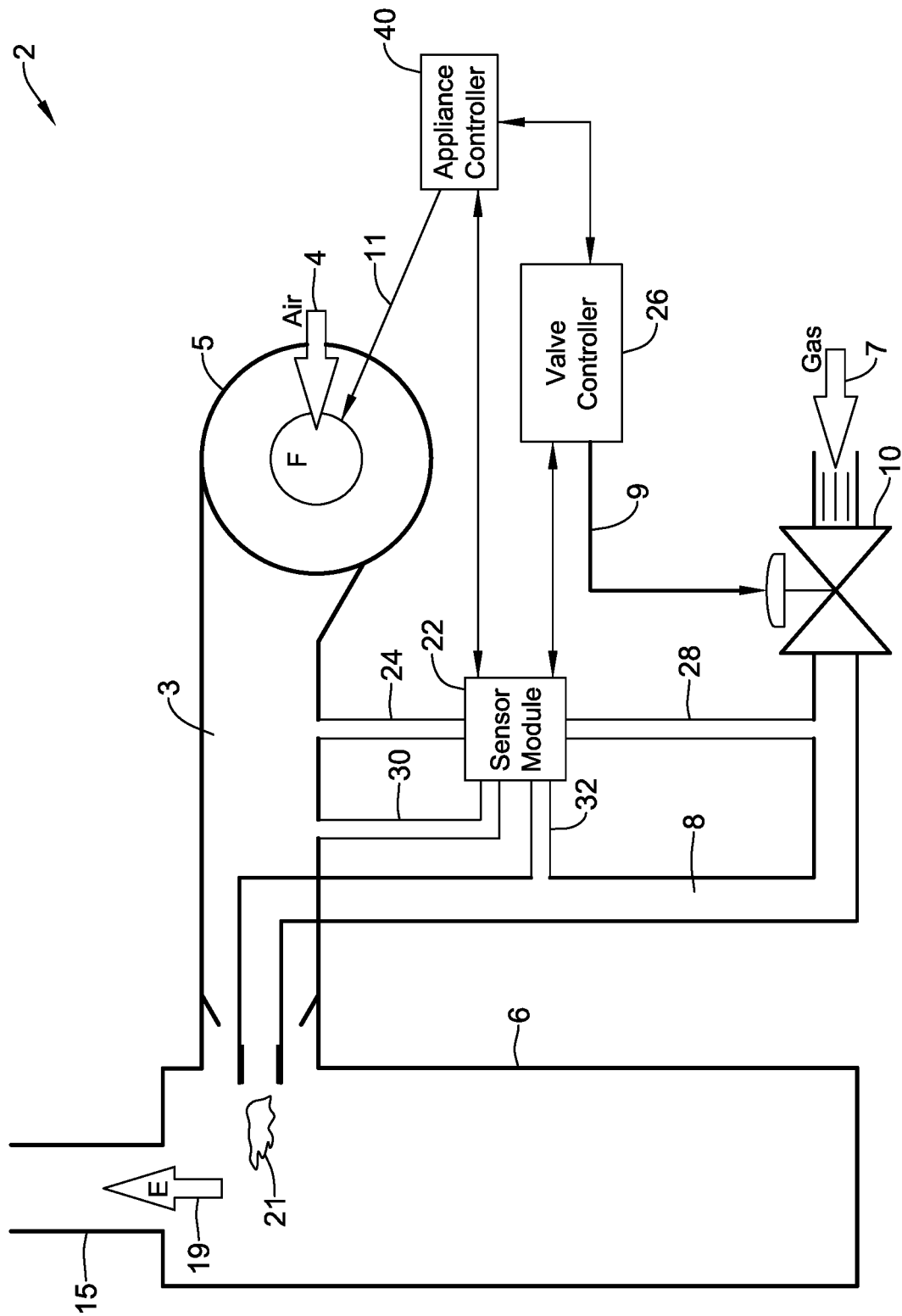
FIG. 1 is a schematic diagram of an illustrative burner control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Sensing modules are used in wide variety of application including, for example, residential, commercial, automotive, aerospace, industrial, and medical applications. In many applications, sensor modules may include one or more sensor devices that detect, for example, flow, pressure, temperature, and/or any other parameters of interest. While not so limited, one example application may be a combustion system that burns a fuel-air mixture in a combustion chamber. In modern combustion systems, there is a desire to replace traditional pneumatic controls of fluid flow (e.g., liquid or gas flow) with electronic control. Example fluid flows include, but are not limited to, air, natural gas, propane, biogas, hydrogen, gaseous by-product from metallurgy and/or a petrochemical industry.

When utilizing electronic controls to control fluid (e.g., air, fuel, etc.) flow to the combustion chamber, it is often desirable to use one or more sensor modules with one or more sensor devices to sense measures related to flow characteristics (e.g., flow rates, pressures, temperature, etc.). Fluid flows to or of a combustion appliance may be particularly prone to producing condensation when there is a change in temperature and/or pressure along the fluid flow. In one example, where fuel or air is provided from a warm exterior (e.g., exterior of a building or room, where temperatures may be as warm as forty (40) degrees Celsius or higher) to a cool interior that is cooler than the warm exterior (e.g., interior the building or room, where temperatures may be as cool as fifteen (15) degrees Celsius or cooler), condensation may form in channels carrying the fluid flow in the cool interior. When the sensor devices become exposed to such condensation, the sensor devices may become damaged and/or may provide inaccurate sensor readings. The present disclosure discloses various techniques to help mitigate such condensation on or adjacent to the sensor devices, thereby increasing the reliability of the system.

FIG. 1 is schematic diagram of a burner control system 2 (e.g., a combustion appliance) having a fuel and air mixture where an air/fuel ratio is adjustable. The burner control system 2 depicted in FIG. 1 is only illustrative, and it is contemplated a burner control system may have one or more additional or alternative components and/or configurations.

The illustrative burner control system 2 may have an air supply channel 3 for supplying air 4 into a chamber 6 (e.g., a combustion chamber or other suitable chamber) with a fan 5 at one end of the channel 3. At the other end of channel 3, the supplied air 4 may enter the chamber 6. Fuel 7 may be injected, via a fuel channel 8, into the airflow at a location in the air supply channel 3 and/or in the chamber 6. The fuel channel 8 may be connected to a gas valve assembly 10 that controls a flow of gas to the fuel channel 8 and thus, to the air supply channel 3 and/or the chamber 6.

A valve controller 26 may be in communication with the valve assembly 10 or may be part of the valve assembly 10. In some cases, the valve controller 26 may provide a signal 9 to the valve assembly 10 to adjust a position of a valve (e.g., valve member) of the valve assembly 10. In some cases, the valve assembly 10 may be motorized and may be configured to open and/or close the valve thereof incrementally according to the signal 9. For example, the valve controller 26 may send the signal 9 to the valve assembly 10 to incrementally open the valve when more fuel is needed and may send the signal 9 to the valve assembly 10 to incrementally close the valve when less fuel is needed.

In some cases, the valve controller 26 may be connected to or in communication with a combustion appliance controller 40 (e.g., a burner controller or other suitable appliance controller), where the valve controller 26 and the combustion appliance controller 40 may be configured to send control signals, diagnostic signals, data signals, or other suitable signals to one another. The combustion appliance controller 40 may be connected to or in communication with the fan 5, which may be varied in speed according to a signal 11 from the combustion appliance controller 40 to vary a flow of air 4 through the air supply channel 3 and establish a burner load or firing rate. In such cases, the valve controller 26 may be configured to receive a control signal indicating a firing rate (e.g. set speed of the fan 5) from the combustion appliance controller 40. Changing speeds of the fan 5 may increase or decrease the burner load or firing rate of the burner or combustion appliance, as the burner load or firing rate may be or may be a function of the speed of the fan 5. The valve controller 26 may then incrementally increase the flow of gas based on the firing rate to achieve a desired air-to-fuel ratio at the combustion chamber 6.

Alternatively or in addition, the valve controller 26 may be in direct communication with or directly connected to the fan 5 (e.g., without the separate combustion appliance controller 40 as an intermediary). In such configurations, the fan 5 may be varied in speed according to a signal from the valve controller 26 to vary a flow of air 4 through the air supply channel 3 and establish a burner load or firing rate. The valve controller 26 may also send a signal 9 to change (e.g., increase or decrease) the flow of gas based on the firing rate to achieve a desired air-to-fuel ratio at the combustion chamber 6. Alternatively or in addition, the valve controller 26 and the appliance controller 40 may be integrated into a single controller and/or the functionalities of the valve controller 26 and/or appliance controller 40 may be different from the above described example functionalities thereof.

In the example shown in FIG. 1, a sensor module 22 may be in communication with the valve controller 26 and/or the combustion appliance controller 40. The sensor module 22 may receive fluid from one or more measurement channels. In the particular example shown, the sensor module 22 may receive a flow of air 4 from one or more air inlet measurement channels 24 extending from the air supply channel 3, and/or a flow of fuel 7 from one or more fuel inlet measurement channels 28 extending from the fuel channel 8. In some cases, air 4 may return to the air supply channel 3 via an air return channel 30, the combustion chamber 6, and/or a mixing chamber, and fuel may return to the fuel channel 8 via a fuel return channel 32, the combustion chamber 6, and/or the mixing chamber.

The sensor module 22 may include one or more flow sensors, one or more pressure sensors, one or more differential pressure sensors, one or more gauge pressure sensor, one or more temperature sensors, one or more humidity sensors, and/or any other suitable sensor. In some cases, the sensor module 22 may be configured to sense one or more flow characteristics and/or measurements related to flow characteristics of the fluid passing through the sensor module 22. In some cases, the sensor module 22 may include a set of sensors for sensing fluid from each measurement channel providing fluid to the sensor module 22, where each set of sensors may include the same set of sensors or a different set of sensors. The sensor module 22 may be configured to communicate measures sensed by the sensor devices to one or more of the valve controller 26 and the combustion appliance controller 40 via one or more wired or wireless interfaces.

Figure 2:
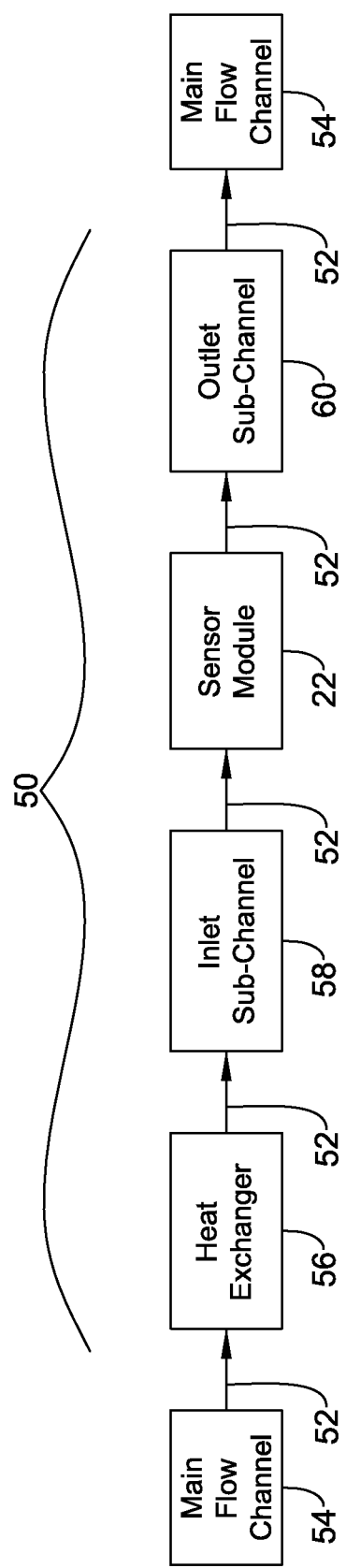
FIG. 2 is a schematic flow diagram of an illustrative path for a fluid through a flow sensing system.

FIG. 2 depicts an illustrative flow diagram for a fluid traveling through a flow sensing system 50 that may be configured to prevent or mitigate condensation from forming on or in the sensor module 22. The illustrative flow sensing system 50 may include a heat exchanger 56, an inlet sub-channel 58 (e.g., the or part of the air inlet measurement channel 24, the fuel inlet measurement channel 28, or other suitable measurement channel), the sensor module 22, an outlet sub-channel (e.g., the or part of the air return channel 30, the fuel return channel 32, or other suitable return channel). In some cases, one or more of the heat exchanger 56, the inlet sub-channel 58 (e.g., an inlet signal pipe), and the outlet sub-channel 60 (e.g., an outlet signal pipe) may be omitted from the flow sensing system and/or one or more additional components may be utilized to facilitate preventing or mitigating condensation in and/or at the sensor module 22.

As depicted in FIG. 2, a fluid flow 52 may be taken from a main flow traveling through a main flow channel 54 (e.g., the flow of air 4 in the air supply channel 3 and the flow of fuel 7 in the fuel channel 8) and passed to the heat exchanger 56, where the heat exchanger 56 may be configured to cool the fluid flow 52 as the fluid flow passes through the heat exchanger 56. It is contemplated that the heat exchanger 56 may be a passive heat exchanger. From the heat exchanger 56, the fluid flow 52 may travel through the inlet sub-channel 58 to the sensor module 22, where one or more measurements related to a flow characteristic may be sensed. Then, from the sensor module 22, the fluid flow 52 may travel through the outlet sub-channel 60 and return to the main flow channel 54. Alternatively, or in addition, the outlet sub-channel 60 may output the fluid flow 52 to one or more other locations.

Figure 3:
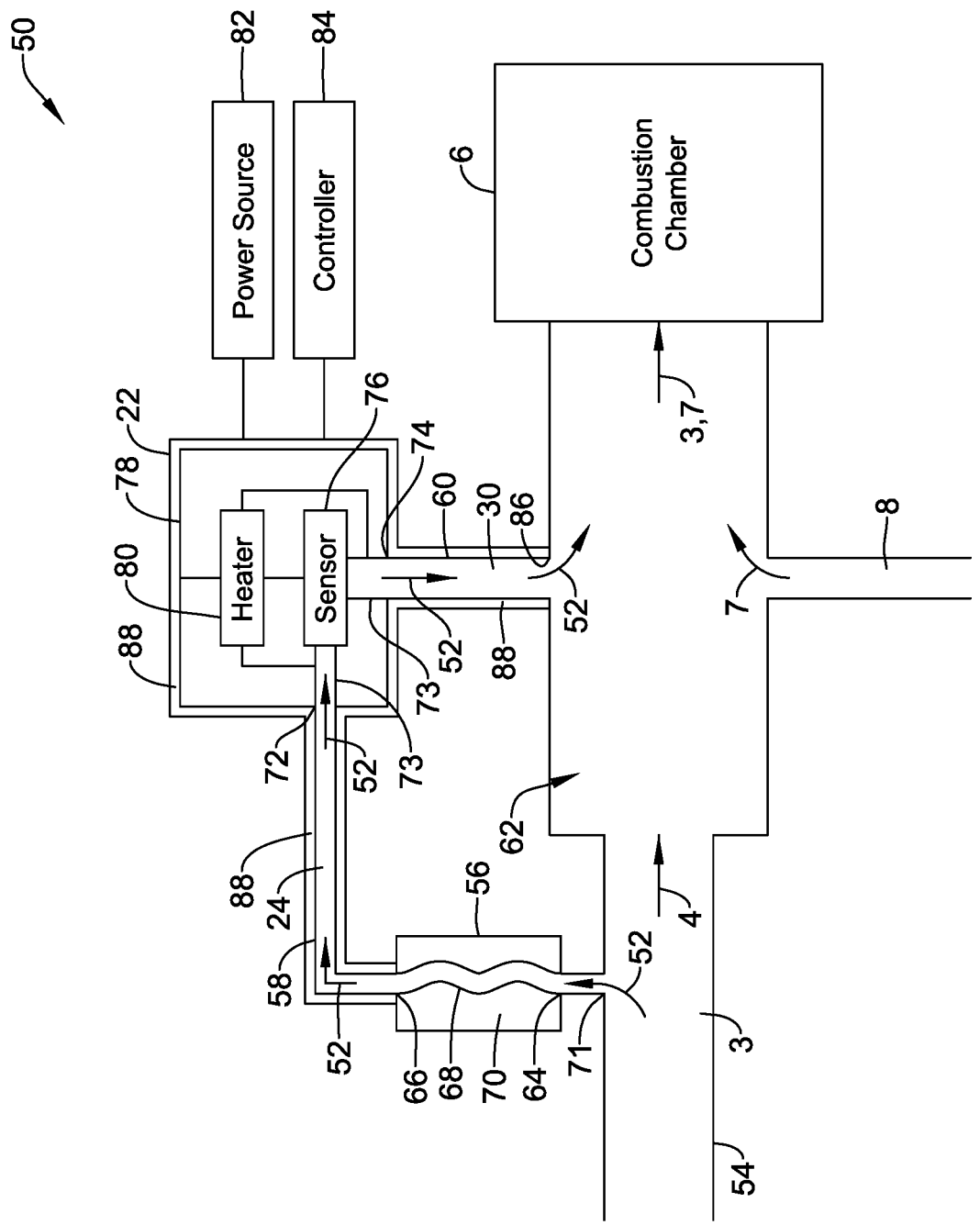
FIG. 3 is a schematic diagram of an illustrative flow sensing system.

FIG. 3 depicts a schematic diagram of an illustrative flow sensing system 50 having the heat exchanger 56 and the sensor module 22. The illustrative flow sensing system 50 is configured to prevent or mitigate condensation from forming in or at the sensor module 22, including on the sensor device(s) of the sensor module 22. The illustrative flow sensing system 50 may take a fluid flow 52 (e.g., a liquid or gas) from the main flow channel 54 (e.g., a conduit), pass the fluid flow 52 through the heat exchanger 56, through the sensor module 22, and return the fluid flow 52 to the main flow channel 54. In some cases, the cooled and/or sensed fluid may be returned to a mixing chamber portion 62 of the main channel, in which a flow of air 4 and a flow of fuel 7 may mix, but this is not required.

The heat exchanger 56 may be any type of heat exchanger that is configured to create a difference in temperature of a fluid between a temperature of the fluid at an inlet of the heat exchanger and a temperature of the fluid at the outlet of the heat exchanger. The heat exchanger 56 may be a passive heat exchanger that may cool a fluid passing therethrough without introducing an energy source. In contrast, an active heat exchanger uses an energy source to transfer heat from one side of the heat exchanger to the other (e.g., e.g., thermoelectric cooler, a Peltier heat exchanger, etc.). In some cases, the passive heat exchanger 56 may be configured such that a temperature of a fluid exiting the heat exchanger 56 may be within twenty (20) degrees Celsius, within fifteen (15) degrees Celsius, within ten (10) degrees Celsius, within five (5) degree Celsius, within one (1) degree Celsius and/or within any other suitable amount of degrees Celsius of an ambient temperature around the heat exchanger 56. In one example, the heat exchanger 56 may be a passive heat exchanger and may be configured such that an average temperature of a fluid exiting the heat exchanger 56 may be within two (2) degrees of a temperature of the ambient around the heat exchanger 56. In other examples, the heat exchanger 56 may be an active heat exchanger.

The heat exchanger 56 depicted in FIG. 3, particularly when passive, may have an inlet port 64, an outlet port 66, and a tortuous flow channel 68 extending between the inlet port 64 and the outlet port 66. To facilitate transferring heat from the fluid flow 52 passing through the tortuous flow channel 68 to the heat exchanger 56 and to an ambient around the heat exchanger 56, the tortuous flow channel 68 of the heat exchanger 56 may be configured to increase the surface area of contact between the fluid flow 52 and a heat sink portion 70 (e.g., a passive heat sink or other suitable heat sink) of the heat exchanger 56 and/or an amount of time the fluid flow 52 spends in the heat exchanger 56 relative to a surface area of contact of or an amount of time spent in a non-tortuous or direct flow channel to facilitate transferring heat from the fluid flow 52 passing through the heat exchanger 56 to the ambient around the heat exchanger 56.

Figure 4:
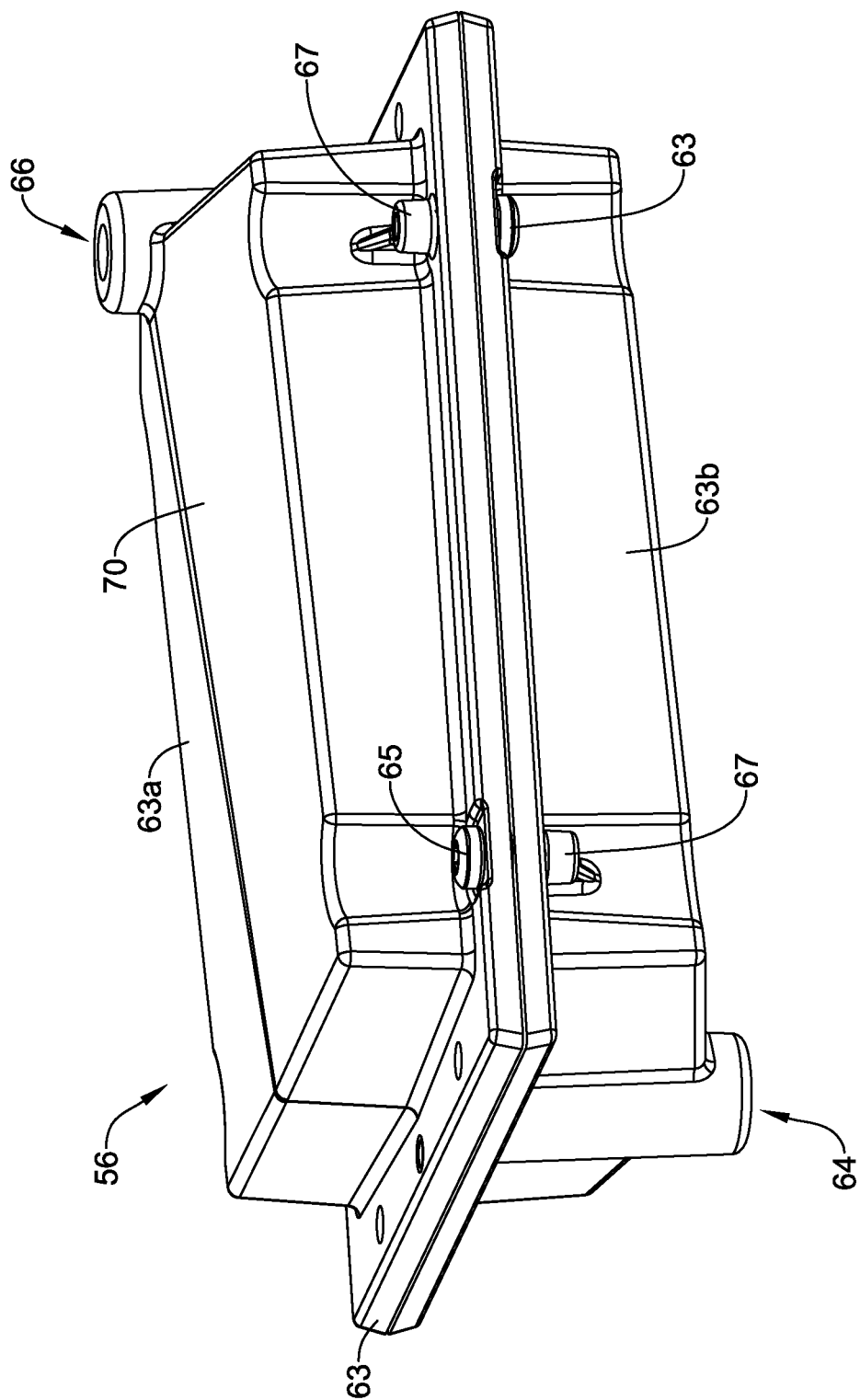
FIG. 4 is a schematic perspective view of an illustrative heat exchanger.

FIG. 4 depicts an example configuration of the heat exchanger 56. As depicted in FIG. 4, the heat exchanger 56 may have a body 63 and/or one or more other suitable components, where the body 63 may define the inlet port 64 and the outlet port 66. Alternatively or in addition, the inlet port 64 and/or the outlet port 66 may be separately formed from the body 63 and connected to the body 63. In some cases, the body 63 may be formed from one or more body portions (e.g., a first body portion 63a and a second body portion 63b, as depicted in FIG. 4, or other suitable number of body portions). When the body 63 is formed from more than one body portion, the body portions may be connected through a suitable connection technique including, but not limited to, threaded fasteners (e.g., bolts 65 and nuts 57, as depicted in FIG. 4, and/or other threaded fasteners), adhesives, weld connections, solder connections, hinge connections, and/or other suitable connection techniques, as desired. Other suitable configurations for the heat exchanger 56 are contemplated.

Figure 5:
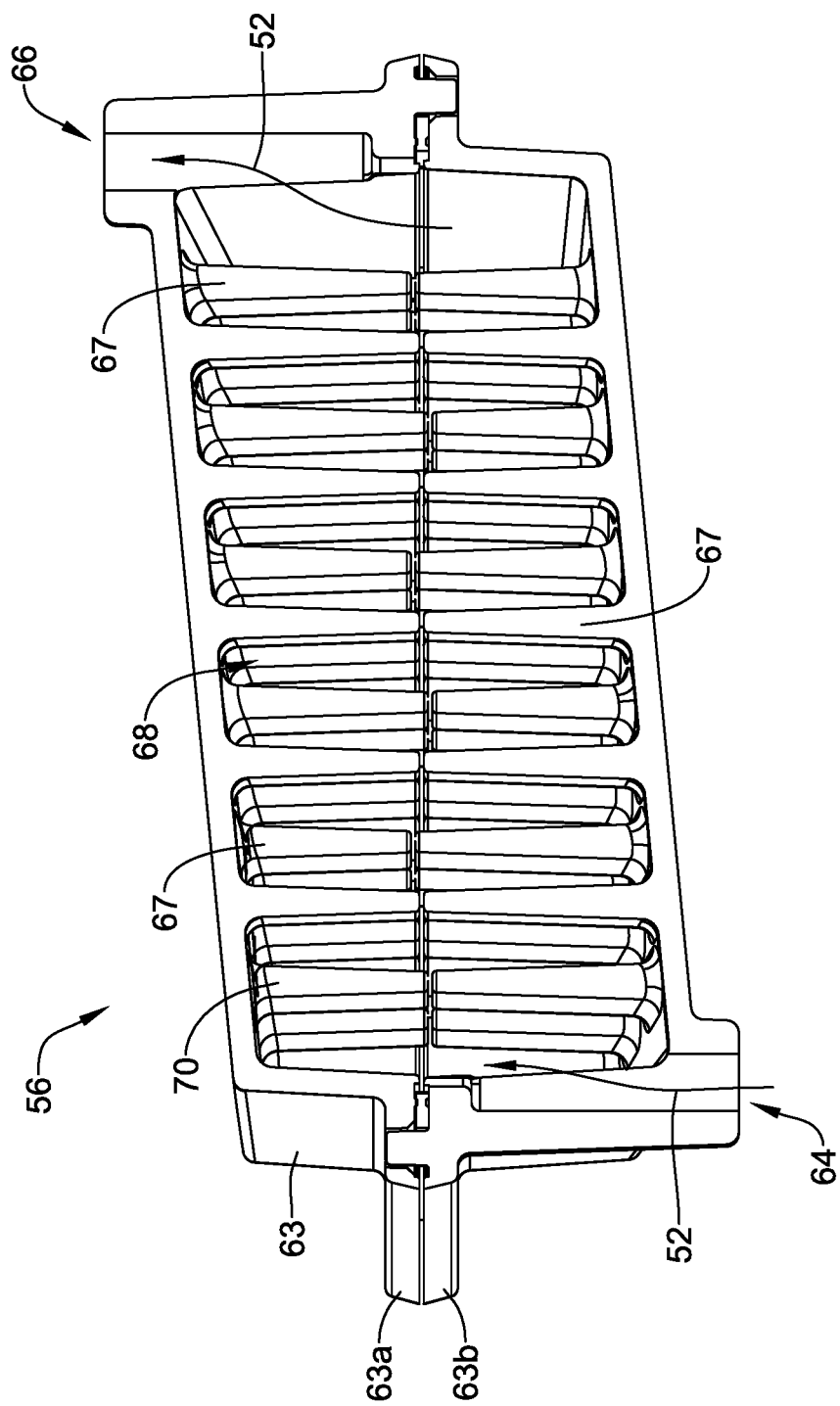
FIG. 5 is a schematic cross-section view of the illustrative heat exchanger depicted in FIG. 4.

FIG. 5 is a cross-section of the example configuration of the heat exchanger 56 depicted in FIG. 4. As can be seen in FIG. 5, fluid flow 52 may flow into the inlet port 64, through the tortuous flow channel 68, and out of the heat exchanger 56 through the outlet port 66. In some cases, the heat exchanger 56 may include one or more projections 67 of, or extending from, the body 63 to form the tortuous flow channel 68 for the fluid flow 52 through the heat exchanger 56. In some cases, the one or more projections 67 along with the body 63 may form the heat sink 70 (e.g., a passive heat sink) to transfer heat from the fluid flow 52 to the ambient around the heat exchanger 56.

When the fluid flow 52 is cooled, some of the water vapor in the fluid flow may condense into a liquid form. The heat exchanger 56 may include a drain to drain any condensation from the heat exchanger 56. The drain, when included, may take on one or more forms. In one example, the drain may be a connection between the tortuous flow path 68 and the main flow channel 54, and may allow condensation that forms in the tortuous flow path 68 of the heat exchanger 56 to drain directly into the main flow channel 54 via gravitational forces. In one example, as depicted in FIG. 5, the body 63 of the heat exchanger 56 may be slanted or angled such that any condensation forming within the tortuous flow channel 68 drains to the inlet port 64. Alternatively or in addition, the heat exchanger 56 may include a liquid collection area that may be manually or automatically emptied into the main flow channel 54, emptied to an ambient through a drain, or may be simply allowed to evaporate to ambient.

The heat exchanger 56 may be formed in any manner. In some cases, parts of the heat exchanger 56 may be formed from a mold and/or using casting techniques. In some cases, parts of the heat exchanger 56 may be formed by machining. In some cases, parts of the heat exchanger 56 may be formed from connecting a plurality of plates to one another (e.g., to form a printed circuit heat exchanger (PCHE)). Other techniques may be utilized to form the heat exchanger 56, as desired.

The heat exchanger 56 may include any suitable material(s). In some cases, the heat exchanger 56 may be configured at least partially from a highly thermally conductive material. For example, aluminum, stainless steel, copper and/or any other suitable thermally conductive material may be used for transferring heat from the incoming fluid flow 52 to ambient.

Returning to FIG. 3, the inlet port 64 of the heat exchanger 56 may be configured to receive the fluid flow 52 from an upstream pickup port 71 of the main flow channel 54, pass the fluid flow 52 from the inlet port 64 through the tortuous flow path 68 that is thermally coupled to the heat sink 70, and to the outlet port 66 of the heat exchanger 56. The heat exchanger 56 may change the temperature of the fluid flow 52 passing through the heat exchanger 56 to a temperature at or above an ambient temperature around the heat exchanger 56 and below a temperature of the fluid flow in the main flow channel 54.

Figure 6:
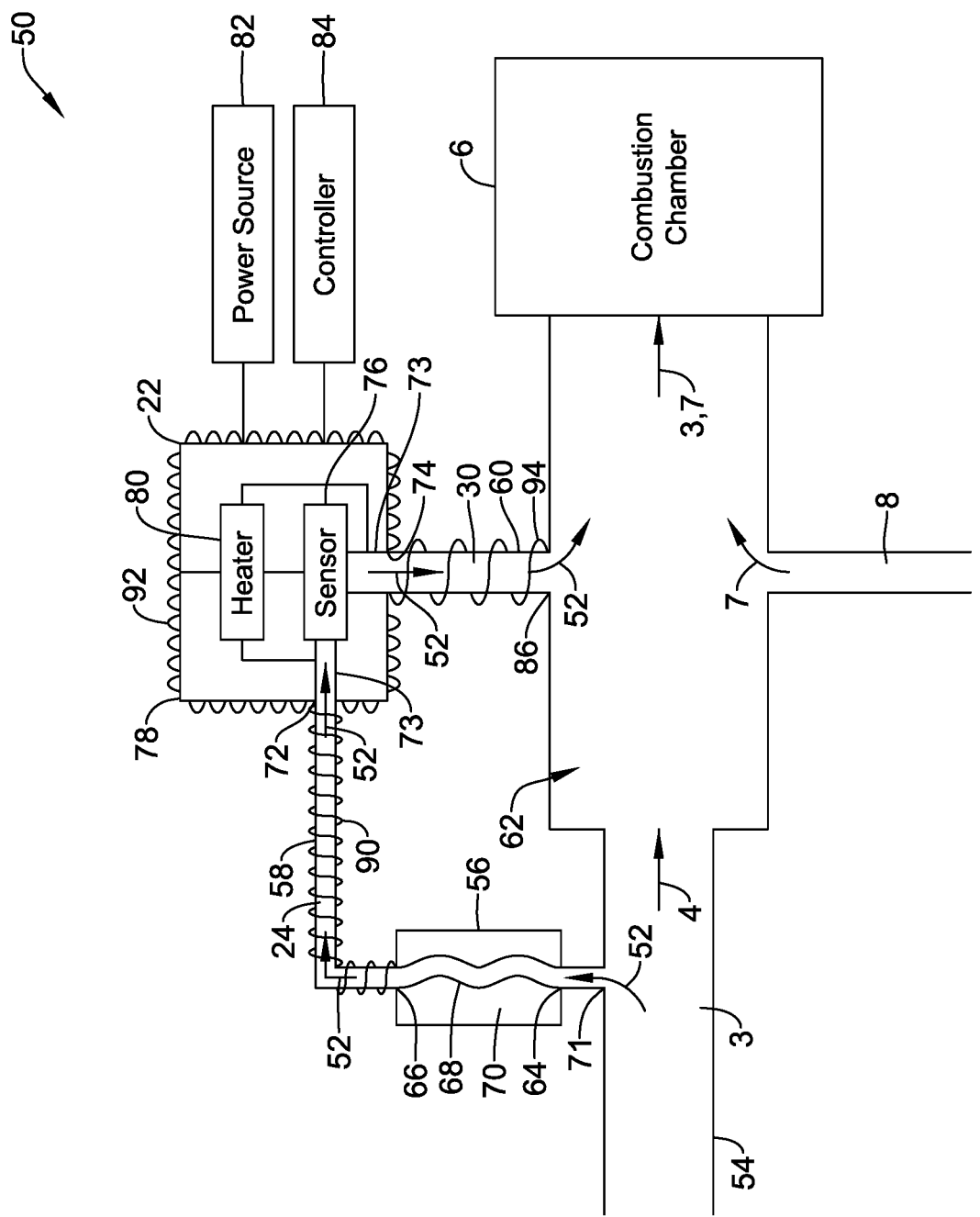
FIG. 6 is a schematic diagram of an illustrative flow sensing system.

The fluid flow 52 may travel from the outlet port 66 of the heat exchanger 56 to an inlet of the sensor module 22. The sensor module 22 may include one or more inlet ports 72, one or more outlet ports 74, one or more flow channels 73 at least partially defined by internal walls of the sensor module 22 that are exposed to the fluid flow 52 and that extend entirely or at least partially between the one or more inlet ports 72 and the one or more outlet ports 74, and/or one or more sensor devices 76. Although the flow channel 73 of the sensor module 22 is depicted in FIGS. 3 and 6 as being two components separated by the one or more sensor devices 76, the flow channel 73 may be a continuous flow channel within which the one or more sensor device(s) 76 are exposed to the fluid flow therein and are configured to sense one or more characteristics of the fluid flow 52. In some cases, the sensor module 22 may include a housing 78 at least partially enclosing or defining the one or more inlet ports 72, the one or more outlet ports 74, and the one or more sensor devices 76. In some cases, the fluid flow 52 may travel through an inlet sub-channel 58 connected to the outlet port 66 of the heat exchanger 56 and the inlet port 72 of the sensor module 22, but this is not required. In some cases, the inlet port 72 of the sensor module 22 may be directly connected to the outlet port 66 of the heat exchanger 56.

Although the sensor module 22 is depicted in FIGS. 3 and 6 as having a single inlet port connected to the main flow channel 54 carrying air 4, the sensor module may include additional inlet ports 72 that may be configured to receive fuel, a mixture of fuel and air, and/or other suitable fluids. As such, the one or more sensor devices 76 of the sensor module 22 may be configured to sense flow characteristics of different flow paths carrying air, fuel, and/or a mixture of fuel and air. Example flow characteristics that the one or more sensor devices 76 of the sensor module 22 may be configured to sense include, but are not limited to, flow rate, pressure, gauge pressure, differential pressure, temperature, fluid type, fluid calorific value, fluid chemical composition, contamination level, and or/one or more other flow characteristics, as desired.

In some cases, the sensor module 22 may include a heater 80. The heater 80 may be configured to heat one or more components of the sensor module 22 to a temperature above a temperature of the fluid flow 52 entering the sensor module 22. For example, the heater 80 may heat the one or more inlet ports 72, the one or more outlet ports 74, the one or more channels 73 and/or walls defining the one or more channels 73, the one or more sensor devices 76, the housing 78, any channels of the sensor module 22, any seals of the sensor module 22, any orifices of the sensor module 22, and/or other components of the sensor module. In some cases, the heater 80 may be configured to heat one or more components of the sensor module 22 to a temperature that is zero (0) to ten (10) degrees Celsius above the expected temperature of the fluid flow 52 exiting the heat exchanger 56 and entering the sensor module 22. In one example, the heater 80 may be configured to heat the one or more sensor devices 76 of the sensor module 22 to a temperature that may average five (5) or about five (5) degrees Celsius above an ambient temperature around the sensor module 22, which may be expected to be above the temperature of the fluid flow 52 exiting the heat exchanger 56 and entering the sensor module 22.

The heater 80 may be any type of heater. In some cases, the heater 80 may be an electrical resistive type heater. In one example, the heater 80 may include one or more resistors mounted on a printed wiring board (PWB) situated in the sensor module. In some cases, the printed wiring board may also carry one or more of the sensor devices 76, but this is not required. In some case, the heater 80 may be configured to sufficiently heat the interior of the sensor module 22 to a consistent temperature above an ambient temperature around the sensor module 22 using, for example, 2 to 3 Watts of power. The sensor module 22 may be insulated by insulation 88 to help hold the heat generated by the heater 80 inside of the sensor module 22.

Those parts of the flow sensing system 50 that are downstream of the heat exchanger 56 may be thermally insulated with one or more layers of insulation 88, as depicted in FIG. 3. For example, the housing 78 of the sensor module 22, the inlet sub-channel 58, the outlet sub-channel 60, and/or one or more other components of the flow sensing system 50 may be entirely or at least partially insulated with one or more layers of insulation 88. The one or more layers of insulation 88 may extend around an exterior surface of one or more components of the flow sensing system 50, an interior surface of one or more components of the flow sensing system, and/or may be applied to the flow sensing system 50 in one or more other suitable manners. In one example, the one or more layers of insulation 88 applied to one or both of the inlet sub-channel 58 and the outlet sub-channel 60 may include one or more thermal insulation sleeves applied along at least part of (e.g., on an exterior surface of) the inlet sub-channel 58 and/or the outlet sub-channel 60. The one or more layers of insulation 88 may include any suitable type(s) of insulation. Example types of insulation may include, but are not limited to, polyurethane foam, polystyrene, fiberglass, closed-cell foam, open-cell foam, and/or any other suitable types of thermal insulation.

The heater 80 may be entirely or at least partially on or within the housing 78 of the sensor module 22. When the heater 80 is entirely or substantially entirely within the housing 78 of the sensor module 22, the heater 80 may be protected from ambient conditions without adding additional housing parts to the sensor module 22 for protecting the heater 80.

The sensor module 22, and in particular the one or more sensor devices 76 and the heater 80 may be in communication with a power source 82 and a controller 84 (e.g., the valve controller 26, the combustion appliance controller 40, and/or other suitable controller). The controller 84 may be part of the sensor module 22 and/or may be at least partially separate from the sensor module 22. Although the power source 82 is depicted in FIGS. 3 and 6 as being separate from the controller 84, the power source 82 may be a component of the controller 84, but this is not required. The power source 82 may be any type of power source including, but not limited to, a battery, line power, or other power source.

The sensor module 22 may be in wired or wireless communication with the controller 84. The sensor module 22 may be in wireless communication with the controller 84 via a Bluetooth™ connection, a WiFi connection, a Zigbee connection, a Redlink connection, or other suitable wireless protocol. Alternatively or in addition, the sensor module 22 may be in wired communication with the controller 84 via a serial port, a parallel port, a CAT5 port, a USB (universal serial bus) port, or the like.

In the example shown, the fluid flow 52 may travel from the outlet port 74 of the sensor module 22 to the main flow channel 54 (e.g., to the mixing chamber 62 of the main flow channel 54 or other suitable location). In some cases, the fluid flow 52 may travel through the outlet sub-channel 60 connected to the outlet port 74 of the sensor module and a downstream pickup port 86 of the main flow channel 54, but this is not required. In some cases, the outlet port 74 of the sensor module 22 may be directly connected to the downstream pickup port 86 of the main flow channel 54. When the fluid flow 52 returns to the main flow channel 54, the fluid flow 52 may travel to the combustion chamber 6 of the combustion appliance. In some cases, the outlet port 74 of the sensor module 22 may be vented to atmosphere or provided to some other location, as desired.

Although the fluid flow 52 is cooled as a result of passing through the heat exchanger 56, a temperature of the fluid flow 52 as it exits the heat exchanger 56 may still be warmer than an ambient temperature and as a result, if the fluid flow 52 exiting the heat exchanger 56 were to interact with a surface at the cooler ambient temperature, condensation may occur at such a location (e.g., in the inlet sub-channel 58, in the sensor module 22, in the outlet sub-channel 60, and/or in one or more other component of flow sensing system 50) downstream of the heat exchanger 56. As such, the heater 80 and/or the one or more layers of insulation 88 insulating one or more components of the flow sensing system 50 may help prevent condensation from forming on components downstream of the heat exchanger 56.

FIG. 6 depicts a schematic diagram of an illustrative flow sensing system 50 substantially similar to the illustrative flow sensing system 50 of FIG. 3, but with wire heating elements 90, 92, 94 extending around portions of the flow sensing system where one or more layers of insulation 88 was depicted in FIG. 3. Although FIG. 6 may depict the heating elements 90, 92, 94 as an alternative for the one or more layers of insulation 88 depicted in FIG. 3, the flow sensing system 50 may include both of the one or more layers of insulation 88 and/or one or more of the heating elements 90, 92, 94. Further, although both of the heater 80 of the sensor module 22 and the heating element 92 wrapped around the housing 78 of the sensor module 22 are depicted in FIG. 6, it is contemplated that one of the heater 80 and the heating element 92 may be omitted if the other is included in the flow sensing system 50, but this is not required.

The heating elements 90, 92, 94 may be any type of electrical heating elements or other suitable types of heating elements. In some cases, the heating elements 90, 92, 94 may include a resistive wire wrapped around a component of the flow sensing system 50, where the wire is in communication with the power source 82 via one or more electrical connections described herein. For example, the heating element 90 may be a resistive wire that is wrapped around an entirety of or at least part of a length of the inlet sub-channel 58 and receives (e.g., directly or indirectly) power from the power source 82 or other suitable power source. Alternatively, or in addition, the heating element 92 may be a wire that is wrapped around an entirety of or at least a portion of the housing 78 of the sensor module 22 and receives power from the power source 82 or other suitable power source. Alternatively, or in addition, the heating element 94 may be a resistive wire that is wrapped around an entirety of or at least part of a length of the outlet sub-channel 60 and receives power from the power source 82 or other suitable power source. Other heating elements may be utilized to heat other components of the flow sensing system 50, as desired.

Although the heating elements 90, 92, 94 are depicted in FIG. 6 as being wire wrapped around components of the flow sensing system 50, the heating elements 90, 92, 94, and/or other heating elements applied to the flow sensor module 22 may take on one or more other forms. For example, the heating elements may be strips covering portions of components of the flow sensing system 50 and/or the heating elements may take on one or more other suitable configurations. One such example of an alternative form of heating may include heat radiated from adjacent hot surfaces such as hot surfaces in ovens, furnaces, boilers, or piping, including, but not limited to, a flow of hot air arising from such hot surfaces.

Figure 7:
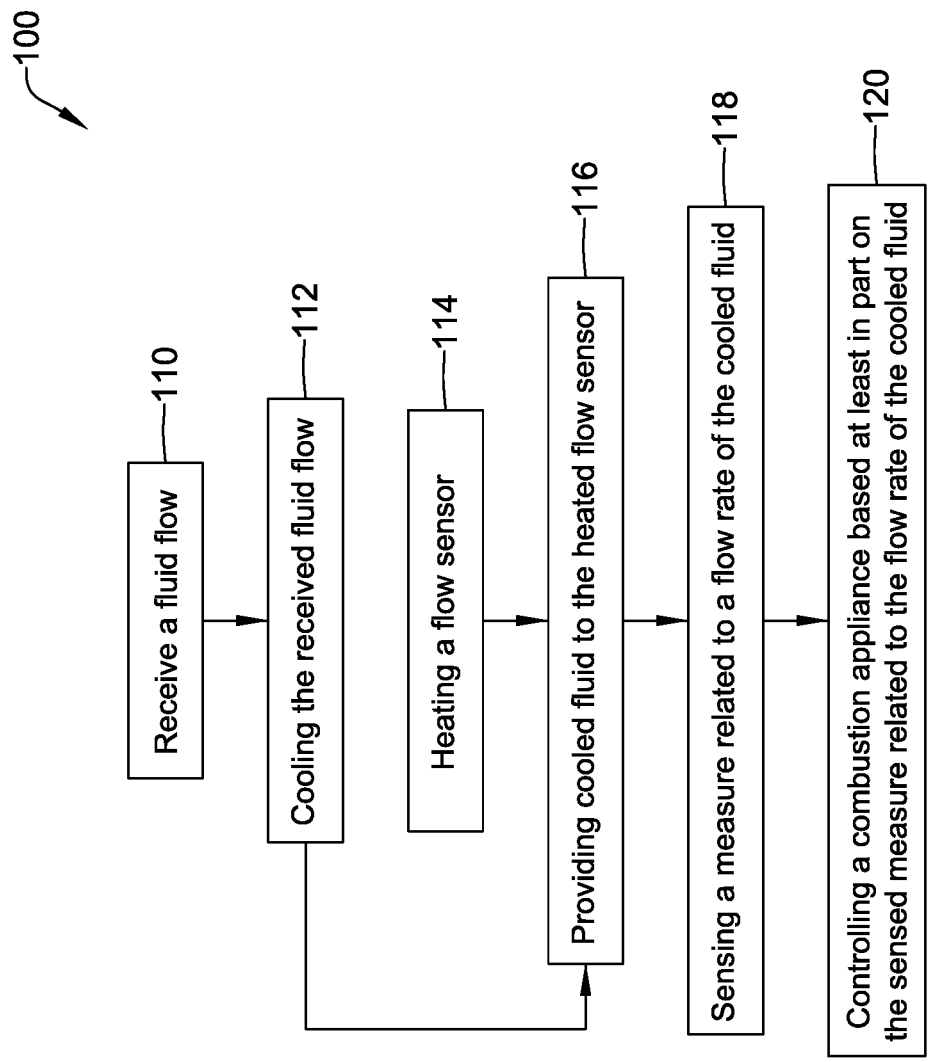
FIG. 7 is a schematic flow diagram of an illustrative method of controlling a combustion appliance based, at least partially, on a measure related to a fluid flow rate.

FIG. 7 depicts a flow diagram of an illustrative method 100 of controlling a combustion appliance based on a measure related to a fluid (e.g., liquid or gas, such as air or fuel) flow rate provided to a combustion appliance. In the illustrative method 100, a fluid flow (e.g., the fluid flow 52 or other suitable fluid flow) may be received 110 and the received fluid flow may be cooled 112. The fluid flow may be received from a main conduit (e.g., the main flow channel 54 or other suitable conduit) and may be cooled at a heat exchanger (e.g., the heat exchanger 56 or other suitable heat exchanger). The fluid flow may be cooled as the fluid flow contacts a passive heat sink (e.g., the heat sink 70 or other suitable heat sink) of the heat exchanger while traveling along a tortuous path (e.g., the tortuous flow channel 68 or other suitable tortuous path) of the heat exchanger. Any condensation that forms in the heat exchanger as a result of cooling the fluid flow may be drained.

The method 100 may further include heating 114 a flow sensor (e.g., the one or more sensor devices 76 or other suitable sensor(s)) and providing 116 the cooled fluid flow to the heated flow sensor. The flow sensor may be heated in any suitable manner. In some cases, the flow sensor may be heated with a resistive heater (e.g., the heater 80, the heating element 92, or other suitable heater) within or adjacent to a housing (e.g., the housing 78 or other suitable housing) that at least partially houses the flow sensor. In some cases, the flow sensor may itself include a resistive heating element that directly heats the flow sensor device. The cooled fluid flow may be provided to the flow sensor. For example, the fluid flow may be provided directly from the heat exchanger to the housing, the fluid flow may pass through a sub-conduit (e.g., the inlet sub-channel 58 or other sub-conduit) of the housing and on to the flow sensor. This is just one example.

The method 100 may further include sensing 118 a measure related to a flow rate of the fluid flow with the heated flow sensor. Measures related to the flow rate of the fluid flow may include, but are not limited to, flow rate, pressure, differential pressure, gauge pressure, temperature, etc. Then, an operation of a combustion appliance may be controlled 120 based, at least in part, on the sensed measure(s) related to the flow rate of the fluid flow. In one example, a controller of a valve (e.g., the valve controller 26 or other suitable controller) and/or a controller of the combustion appliance (e.g., the combustion appliance controller 40 or other suitable controller) may control a burner load of the combustion appliance, an air-fuel (A/F) ratio of fluid provided to the burner, actuator set points, a limit function, and/or other operational characteristics of the combustion application based, at least in part, on the sensed measure related to the flow rate of the fluid flow.

Although the methods and/or processes described herein may be described with respect to combustion appliances, the methods and/or processes may be used in other fluid control applications. Additionally, unless specifically noted, various steps of the methods may be performed in one or more other orders than what is described above or depicted in the Figures. Further, the steps of the disclosed processes and methods may be performed in an automated manner, in real time during operation of the combustion appliance. Alternatively or in addition, the disclosed processes and methods may be manually initiated.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. A flow sensing system for sensing a fluid flow through a conduit, wherein the conduit has an upstream pickup port and a downstream pickup port, the flow sensing system comprising:
   a heat exchanger having an inlet port, an outlet port and a passive heat sink, the inlet port is configured to receive a flow of fluid from the upstream pickup port of the conduit, the heat exchanger is configured to pass the flow of fluid from the inlet port across the passive heat sink and deliver the flow of fluid to the outlet port of the heat exchanger, the heat exchanger comprising a drain for draining condensate; and
   a sensing module having an inlet port, an outlet port and a flow sensor, the inlet port is configured to receive the flow of fluid from the outlet port of the heat exchanger, the sensing module is configured to pass at least part of the flow of fluid across the flow sensor and deliver the flow of fluid to the outlet port of the sensing module, wherein the outlet port of the sensing module is configured to be in fluid communication with the downstream pickup port of the conduit.

2. The flow sensing system of claim 1, further comprising a heater for heating the flow sensor of the sensing module to a temperature that is above a temperature of the at least part of the flow of fluid that is passed across the flow sensor.

3. The flow sensing system of claim 2, wherein the sensing module comprises one or more flow channels that extends from the inlet port to the outlet port of the sensing module, where each of the one or more flow channels is defined by internal walls that are exposed to the flow of fluid received from the outlet port of the heat exchanger, and wherein the heater is configured to heat the internal walls of the one or more flow channels to a temperature that is above a temperature of the flow of fluid received from the outlet port of the heat exchanger.

4. The flow sensing system of claim 2, wherein the sensing module comprises a thermal insulated housing, wherein the heater and the flow sensor are positioned within the thermal insulated housing.

5. The flow sensing system of claim 1, further comprising a signal pipe for carrying the flow of fluid from the outlet port of the heat exchanger to the inlet port of the sensing module, the signal pipe having a thermal insulation sleeve along at least part of its length.

6. The flow sensing system of claim 1, further comprising:
   a signal pipe for carrying the flow of fluid from the outlet port of the heat exchanger to the inlet port of the sensing module; and
   a heater configured to heat the signal pipe along a length of the signal pipe.

7. The flow sensing system of claim 6, wherein the heater is a wire wrapped around the signal pipe.

8. The flow sensing system of claim 1, further comprising:
   an outlet pipe extending from the outlet port of the sensing module to the downstream pickup port of the conduit.

9. The flow sensing system of claim 8, further comprising insulation covering a length of the outlet pipe.

10. The flow sensing system of claim 1, wherein the heat exchanger is configured such that the flow of fluid delivered to the outlet port of the heat exchanger is less than five (5) degrees Celsius above an ambient temperature around the heat exchanger.

11. The flow sensing system of claim 1, wherein the fluid flow through the conduit comprises a flow of a fluid that is in a gaseous state.

12. A flow sensing module comprising:
   a housing having an inlet port, an outlet port, and one or more flow channels extending from the inlet port to the outlet port, where each of the one or more flow channels is defined by internal walls that are exposed to a flow of fluid flowing from the inlet port to the outlet port of the housing;
   a sensor at least partially positioned within the housing and exposed to one or more of the flow channels, the sensor is configured to sense a measure related to a flow rate of fluid flowing from the inlet port to the outlet port of the housing; and
   a heater configured to heat the sensor to a temperature that is above a temperature of the flow of fluid received at the inlet port of the housing.

13. The flow sensing module of claim 12, wherein the heater is configured to heat the internal walls of the one or more flow channels to a temperature that is above a temperature of the flow of fluid received at the inlet port of the housing.

14. The flow sensing module of claim 12, wherein the heater is located at least partially within the housing.

15. The flow sensing module of claim 12, wherein the heater comprises one or more resistors on a printed circuit board that carries the sensor.

16. The flow sensing module of claim 12, wherein the heater extends around at least a portion of an exterior of the housing.

17. The flow sensing module of claim 12, further comprising:
   insulation extending around at least a portion of the housing.

18. A method of sensing a measure related to a gas flow rate provided to a combustion appliance comprising:
   receiving a gas flow;
   cooling the gas flow via a passive heat sink and draining any condensate;
   heating a flow sensor to a temperature above the temperature to which the gas flow was cooled;
   providing the cooled gas flow to the flow sensor;
   sensing a measure related to a flow rate of the cooled gas flow using the flow sensor; and controlling a combustion appliance based at least in part on the measure related to the flow rate of the cooled gas flow.

19. The method of claim 18, wherein the gas flow comprises air.

20. The method of claim 18, wherein the gas flow comprises natural gas.

\* \* \* \* \*